United States Patent
Cao et al.

(10) Patent No.: US 9,380,405 B2
(45) Date of Patent: Jun. 28, 2016

(54) METHOD AND SYSTEM FOR TRIGGERING MTC DEVICE

(75) Inventors: Lanjian Cao, Shenzhen (CN); Wantao Yu, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 96 days.

(21) Appl. No.: 14/380,137

(22) PCT Filed: May 7, 2012

(86) PCT No.: PCT/CN2012/075147
§ 371 (c)(1),
(2), (4) Date: Aug. 21, 2014

(87) PCT Pub. No.: WO2013/127122
PCT Pub. Date: Sep. 6, 2013

(65) Prior Publication Data
US 2015/0036591 A1 Feb. 5, 2015

(30) Foreign Application Priority Data
Mar. 2, 2012 (CN) .......................... 2012 1 0053773

(51) Int. Cl.
H04W 4/00 (2009.01)
H04W 4/12 (2009.01)
H04W 4/14 (2009.01)
H04W 60/00 (2009.01)

(52) U.S. Cl.
CPC .............. *H04W 4/005* (2013.01); *H04W 4/12* (2013.01); *H04W 4/14* (2013.01); *H04W 60/00* (2013.01)

(58) Field of Classification Search
CPC .................................................. H04W 4/005
See application file for complete search history.

(56) References Cited

U.S. PATENT DOCUMENTS

| 7,293,108 | B2 | 11/2007 | Warrier | |
|---|---|---|---|---|
| 2002/0133549 | A1 | 9/2002 | Warrier | |
| 2013/0279372 | A1* | 10/2013 | Jain .................. | H04W 4/06 370/254 |

FOREIGN PATENT DOCUMENTS

| CN | 102088668 A | 6/2011 |
|---|---|---|
| CN | 102118700 A | 7/2011 |

(Continued)

OTHER PUBLICATIONS

Considerations for device triggering—failure scenarios, mailed on Nov. 7, 2011.

(Continued)

*Primary Examiner* — John Blanton
(74) *Attorney, Agent, or Firm* — Oppedahl Patent Law Firm LLC

(57) ABSTRACT

The disclosure discloses a method for triggering a Machine Type Communication (MTC) device, where an SGSN/MME receives a trigger from an MTC-IWF, and determines that the MTC device is in an unattached state and the MTC device is in a communication window of the MTC device; when the MTC device gets attached to the network before expiration of the communication window, the SGSN/MME sends the trigger to the MTC device; or when the MTC device fails to get attached to the network before expiration of the communication window, the SGSN/MME sends a trigger transmission report to the MTC-IWF, such that the MTC-IWF saves the trigger by sending the trigger to an SMS-SC, and forwards the trigger transmission report to an MTC server initiating the trigger. The disclosure further discloses a system for triggering an MTC device corresponding to the method. With the disclosure, an MTC device in an unattached state can be triggered.

18 Claims, 5 Drawing Sheets

(56) References Cited

FOREIGN PATENT DOCUMENTS

| | | |
|---|---|---|
| CN | 102149105 A | 8/2011 |
| WO | 02076065 A2 | 9/2002 |

OTHER PUBLICATIONS

System Improvements for Machine-Type Communications, mailed on Dec. 2, 2011.

Normative documentation for MT-SMS based Device Trigger, mailed on Nov. 18, 2011.

Deferred Triggering, mailed on May 11, 2011.

Supplementary European Search Report in European application No. 12870261.0, mailed on Jan. 21, 2015.

International Search Report in international application No. PCT/CN2012/075147, mailed on Dec. 13, 2012.

English Translation of the Written Opinion of the International Search Authority in international application No. PCT/CN2012/075147, mailed on Dec. 13, 2012.

* cited by examiner

METHOD AND SYSTEM FOR TRIGGERING MTC DEVICE

TECHNICAL FIELD

The disclosure relates to the field of communication technology, and particularly to a method and system for triggering a Machine Type Communication (MTC) device.

BACKGROUND

MTC refers to data exchange between two entities without human interference, i.e., a dialog between two machines.

The number of MTC devices in an MTC system will be far more than that of terminals in existing Human to Human (H2H) communication. Massive data will be produced in communication among such a large number of MTC devices, and have to be transmitted through a communication network. Such communications among machines also require network side management. An existing wireless communication network becomes a most effective and promising information bearing transmission technology for MTC communication due to exemption for wiring and a wide coverage.

In future industry, MTC devices will be used in various businesses. There is a pressing need for a solution for processing massive data exchange produced by such a great number of MTC devices. To allow optimizing signaling/data transmission between a network side and an MTC device, an MTC device may keep only a signaling connection to a control plane of the network when the MTC device does not have to exchange data with a network, and establishes a data connection on a user plane only when the MTC device has to exchange data with the network side. In the way, when an MTC server requires an MTC device to report data, the MTC server has to trigger the MTC device first to wake up the MTC device before a data connection on a user plane can be established between the MTC device and the network.

At the same time, in order to avoid access of a network by massive MTC devices at the same time, thus overburdening or even paralyzing the network, a time control feature is required to control timing of access by an MTC device. A time window for communication of an MTC device is determined by both subscription information of the MTC device and a strategy of a local network operator. The time window for communication of each MTC device is set by the network, and the MTC device can access the network only in the time window for communication, thereby preventing network overload caused by simultaneous attempts of massive MTC devices to access a network.

In triggering an MTC device, an MTC server generates a request for triggering an MTC device and sends the request to a 3rd Generation Partnership Project (3GPP) network. When the MTC device has a time control feature, the 3GPP network not only has to verify if the MTC server is valid and authorized to trigger the MTC device, but also has to inquire about whether the MTC device is in a time window for communication set for the MTC device by the network. The MTC server may not send a trigger to the MTC device unless the MTC device is in the time window for communication.

As an MTC device will be forced to get detached from a network at the expiration of a communication window of the MTC device, when the MTC device is in an attached state, the MTC device must be in a period of the communication window. When the MTC device is in an unattached state, the MTC device may or may not be in a period of the communication window. An attached MTC device may be triggered in an existing trigger mode without the need of determining time control information of the MTC device. However, in triggering an unattached MTC device, the time control information of the MTC device has to be determined to improve a trigger efficiency. Currently, no method for triggering an unattached MTC device is proposed.

SUMMARY

In view of this, it is desired that embodiments of the disclosure provide a method and system for triggering an MTC device, capable of triggering an unattached MTC device.

To this end, a technical solution of an embodiment of the disclosure is implemented as follows.

A method for triggering a Machine Type Communication (MTC) device, including steps of:

receiving, by a Serving General Packet Radio Service Support Node (SGSN)/Mobility Management Entity (MME), a trigger from an MTC InterWorking Function (MTC-IWF), wherein the trigger carries at least an International Mobile Subscriber Identifier (IMSI) of an MTC device to be triggered, and information on whether the MTC device is capable of receiving a short message;

determining, by the SGSN/MME, whether the MTC device is in an unattached state; determining whether the MTC device is in a communication window of the MTC device; and when it is determined that the MTC device is in an unattached state, and the MTC device is in a communication window of the MTC device, waiting for attachment of the MTC device to a network; and when the MTC device gets attached to the network before expiration of the communication window, sending, by the SGSN/MME, the trigger to the MTC device; or when the MTC device fails to get attached to the network before expiration of the communication window, sending, by the SGSN/MME, a trigger transmission report to the MTC-IWF, such that after receiving the trigger transmission report, the MTC-IWF saves the trigger by sending the trigger to a Short Message Service Center (SMS-SC), and forwards the trigger transmission report to an MTC server initiating the trigger.

In an embodiment, the step of sending, by the SGSN/MME, the trigger to the MTC device may be: sending, by the SGSN/MME, the trigger to the MTC device by Network Access Service (NAS) signalling; and the method may further include a step of: when the SGSN/MME fails to send the trigger to the MTC device by NAS signalling, and the MTC device is capable of receiving a short message, sending, by the SGSN/MME, the trigger to the SMS-SC, and triggering the MTC device by Short Message Service (SMS).

In an embodiment, the method may further include steps of: after the SGSN/MME determines that the MTC device is in the unattached state, determining, by the SGSN/MME, whether the communication window of the MTC device is stored locally, and when the communication window of the MTC device is stored locally, determining whether the MTC device is in the communication window; and when the communication window of the MTC device is not stored locally, further determining, by the SGSN/MME, whether time control information of the MTC device is stored locally; when the communication window of the MTC device is not stored locally, but the time control information of the MTC device is stored locally, generating a communication window according to the time control information and a local network strategy, and then determining whether the MTC device is in the generated communication window; when neither the communication window of the MTC device nor the time control information of the MTC device is stored locally, obtaining the time control information of the MTC device from a Home Subscriber Server (HSS)/Home Location Register (HLR), generating a communication window according to the time control information and the local network strategy, and then determining whether the MTC device is in the generated communication window.

In an embodiment, the method may further include a step of:

when it is determined that the MTC device is in an unattached state and is outside a communication window of the MTC device, sending, by the SGSN/MME, a trigger transmission report to the MTC-IWF, such that after receiving the trigger transmission report, the MTC-IWF saves the trigger by sending the trigger to the SMS-SC, and forwards the trigger transmission report to the MTC server initiating the trigger.

In an embodiment, before the SGSN/MME receives the trigger from the MTC-IWF, the MTC server may send the MTC-IWF a trigger transmission request carrying an external identifier of the MTC device to be triggered, a trigger reference code, the trigger, and information on the MTC server;

after determining that the MTC server is valid according to the trigger transmission request, the MTC-IWF may request an HSS/HLR to verify whether the MTC server is authorized to trigger the MTC device;

the HSS/HLR may return to the MTC-IWF a response carrying information on whether the MTC server is authorized to trigger the MTC device, the IMSI of the MTC device, an address of the SGSN/MME, and the information on whether the MTC device is capable of receiving a short message; and when determining that the MTC server is authorized to trigger the MTC device according to the response, the MTC-IWF may forward the trigger to the SGSN/MME.

In an embodiment, the trigger transmission report may carry a reason for an unsuccessful trigger of the MTC device, and the IMSI and the communication window of the MTC device, and after the MTC-IWF forwards the trigger transmission report to the MTC server initiating the trigger, the MTC server may initiate another trigger upon arrival of the next communication window.

A system for triggering a Machine Type Communication (MTC) device, includes a Serving General Packet Radio Service Support Node (SGSN)/Mobility Management Entity (MME), an MTC InterWorking Function (MTC-IWF), an MTC device, a Short Message Service Center (SMS-SC), and an MTC server, wherein the SGSN/MME is configured for: receiving a trigger from the MTC-IWF, wherein the trigger carries at least an International Mobile Subscriber Identifier (IMSI) of the MTC device to be triggered and information on whether the MTC device is capable of receiving a short message; determining whether the MTC device is in an unattached state; determining whether the MTC device is in a communication window of the MTC device; when it is determined that the MTC device is in an unattached state, and the MTC device is in a communication window of the MTC device, waiting for attachment of the MTC device to a network; and when the MTC device gets attached to the network before expiration of the communication window, sending the trigger to the MTC device; or when the MTC device fails to get attached to the network before expiration of the communication window, sending a trigger transmission report to the MTC-IWF;

the MTC-IWF is configured for: sending the trigger to the SGSN/MME, and after receiving the trigger transmission report, saving the trigger by sending the trigger to the SMS-SC, and forwarding the trigger transmission report to the MTC server initiating the trigger;

the MTC device is configured for: receiving the trigger sent by the SGSN/MME;

the SMS-SC is configured for: storing the trigger sent by the MTC-IWF; and the MTC server is configured for: receiving the trigger transmission report forwarded by the MTC-IWF.

In an embodiment, the SGSN/MME may be specifically configured for: sending the trigger to the MTC device by Network Access Service (NAS) signalling; and when the SGSN/MME fails to send the trigger to the MTC device by NAS signalling, and the MTC device is capable of receiving a short message, sending the trigger to the SMS-SC.

In an embodiment, the SGSN/MME may be further configured for: after the SGSN/MME determines that the MTC device is in the unattached state, determining whether the communication window of the MTC device is stored locally, and when the communication window of the MTC device is stored locally, determining whether the MTC device is in the communication window; and when the communication window of the MTC device is not stored locally, further determining whether time control information of the MTC device is stored locally; when the communication window of the MTC device is not stored locally, but the time control information of the MTC device is stored locally, generating a communication window according to the time control information and a local network strategy, and then determining whether the MTC device is in the generated communication window; when neither the communication window of the MTC device nor the time control information of the MTC device is stored locally, obtaining the time control information of the MTC device from a Home Subscriber Server (HSS)/Home Location Register (HLR), generating a communication window according to the time control information and the local network strategy, and then determining whether the MTC device is in the generated communication window.

In an embodiment, the SGSN/MME may be further configured for: when it is determined that the MTC device is in an unattached state and is outside a communication window of the MTC device, sending a trigger transmission report to the MTC-IWF; and the MTC-IWF may be further configured for: after receiving the trigger transmission report, saving the trigger by sending the trigger to the SMS-SC, and forwarding the trigger transmission report to the MTC server initiating the trigger.

In an embodiment, the system may further include an HSS/HLR, wherein the MTC server may be further configured for: sending the MTC-IWF a trigger transmission request carrying an external identifier of the MTC device to be triggered, a trigger reference code, the trigger, and information on the MTC server;

the MTC-IWF may be further configured for: after determining that the MTC server is valid according to the trigger transmission request, requesting the HSS/HLR to verify whether the MTC server is authorized to trigger the MTC device; and when determining that the MTC server is authorized to trigger the MTC device according to a response returned by the HSS/HLR, forwarding the trigger to the SGSN/MME; and the HSS/HLR may be configured for: returning to the MTC-IWF the response carrying information on whether the MTC server is authorized to trigger the MTC device, the IMSI of the MTC device, an address of the SGSN/MME, and the information on whether the MTC device is capable of receiving a short message.

In an embodiment, the MTC server may be further configured for: after receiving the trigger transmission report forwarded by the MTC-IWF, initiating another trigger upon arrival of the next communication window.

With the method and system for triggering an MTC device according to embodiments of the disclosure, an SGSN/MME receives a trigger from an MTC-IWF, and determines that the MTC device is in an unattached state and the MTC device is in a communication window of the MTC device; when the MTC device gets attached to the network before expiration of the communication window, the SGSN/MME sends the trigger to the MTC device; or when the MTC device fails to get attached to the network before expiration of the communication window, the SGSN/MME sends a trigger transmission report to the MTC-IWF, such that the MTC-IWF saves the trigger by sending the trigger to an SMS-SC, and forwards the trigger transmission report to an MTC server initiating the trigger. With a solution according to an embodiment of the disclosure, an MTC device in an unattached state can be triggered.

DETAILED DESCRIPTION

Figure 1:
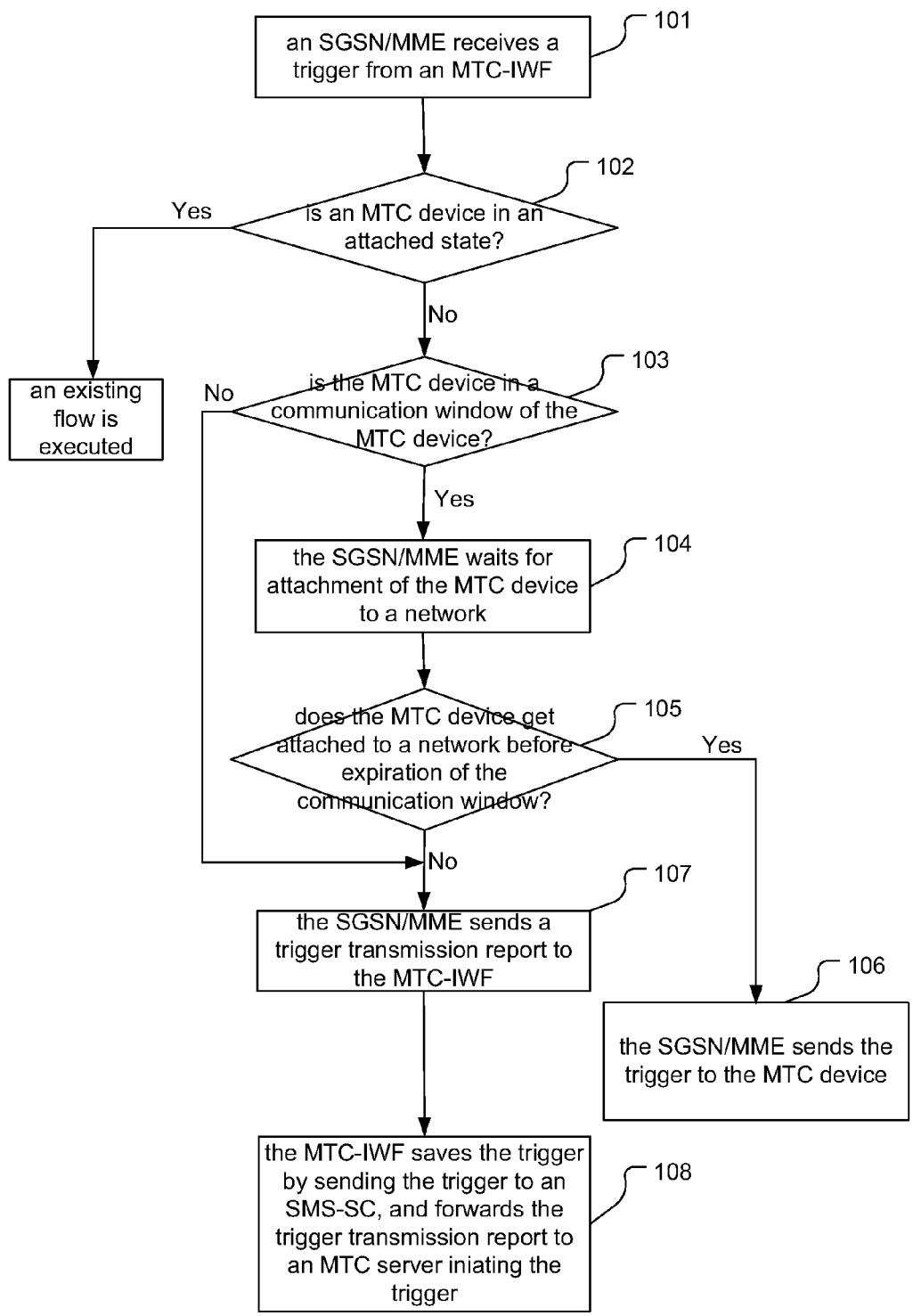
FIG. 1 is a flow chart of a method for triggering an MTC device according to an embodiment of the disclosure.

According to embodiments of the disclosure, an SGSN/MME receives a trigger from an MTC InterWorking Function (MTC-IWF), and determines that the MTC device is in an unattached state and the MTC device is in a communication window of the MTC device; when the MTC device gets attached to the network before expiration of the communication window, the SGSN/MME sends the trigger to the MTC device; or when the MTC device fails to get attached to the network before expiration of the communication window, the SGSN/MME sends a trigger transmission report to the MTC-IWF, such that the MTC-IWF saves the trigger by sending the trigger to an SMS-SC, and forwards the trigger transmission report to an MTC server initiating the trigger.

A certain MTC device with a time control feature can access a network only in a communication window allocated to the MTC device by the network. When an MTC server triggers an MTC device having a time control feature through a network, the network has to first determine whether the MTC device is in a period of the communication window of the MTC device; An MTC server may not trigger such an MTC device unless the MTC device is in a period of the communication window of the MTC device.

An MTC device will be forced to get detached from a network at the expiration of a communication window of the MTC device such that the MTC device is disconnected from the network. When an MTC device is in an attached state, the MTC device must be in a period of the communication window of the MTC device. When an MTC device is in an unattached state, the MTC device may or may not be in a period of the communication window of the MTC device. When an MTC server is to trigger an MTC device, and a network finds that the MTC device is in an unattached state in the communication window of the MTC device, the MTC device may get attached to the network in the communication window; thus, the network may start a timer, store the trigger in the communication window of the MTC device and wait; the trigger may be sent to the MTC device at once when the MTC device gets attached to the network. When the network finds that the MTC device is in an unattached state outside the communication window of the MTC device, the MTC device may not get attached to the network soon, in which case the network may store the trigger in an SMS-SC, such that once the MTC device gets attached to the network, the MTC device may be triggered by SMS; meanwhile, the network informs the MTC server of the communication window of the MTC device, making the MTC server to initiate another trigger upon arrival of the communication window of the MTC device.

In an embodiment of the disclosure, not only the MTC-IWF and the HSS/HLR have to authenticate the MTC server to allow only an authorized MTC server to trigger an MTC device, but the MTC-IWF also has to inquire the SGSN/MME to see if the MTC device is in an attached state in the communication window set for the MTC device by the network. An MTC device in its communication window and an MTC device outside its communication window are treated differently to reduce burden of the network in trigger and improve efficiency of the trigger flow.

FIG. 1 is the flow chart of a method for triggering an MTC device according to an embodiment of the disclosure. As shown in FIG. 1, the method includes steps as follows.

In Step 101, a Serving General Packet Radio Service Support Node (SGSN)/Mobility Management Entity (MME) receives a trigger from an MTC InterWorking Function (MTC-IWF).

Here, the trigger carries at least an International Mobile Subscriber Identifier (IMSI) of an MTC device to be triggered, and information on whether the MTC device is capable of receiving a short message.

Note that before the step, the MTC server may send the MTC-IWF a trigger transmission request carrying an external identifier of the MTC device to be triggered, a trigger reference code (for preventing a replay attack), the trigger, and information on the MTC server;

after determining that the MTC server is valid according to the trigger transmission request, the MTC-IWF may request an HSS/HLR to verify whether the MTC server is authorized to trigger the MTC device;

the HSS/HLR may return to the MTC-IWF a response carrying information on whether the MTC server is authorized to trigger the MTC device, the IMSI of the MTC device, an address of the SGSN/MME, and the information on whether the MTC device is capable of receiving a short message; and when determining that the MTC server is authorized to trigger the MTC device according to the response, the MTC-IWF may forward the trigger to the SGSN/MME.

The MTC server requests a 3GPP network to transmit the trigger through the trigger transmission request. The trigger is an operation to be executed by the MTC device after receiving the trigger (as instructed by the MTC server). The operation is a behavior agreed on by both the MTC server and the MTC device.

In Step 102, the SGSN/MME determines whether an MTC device to be triggered by the trigger is in an attached state; if the MTC device is attached, an existing flow is executed; or if the MTC device is not attached, Step 103 is executed.

In Step 103, the SGSN/MME determines whether the MTC device is in a communication window of the MTC device; if the MTC device is in its communication window, step 104 is executed; or if the MTC device is outside its communication window, Step 107 is executed.

Note that before the step, the method may further include that:

the SGSN/MME determines whether the communication window of the MTC device is stored locally, and when the communication window of the MTC device is stored locally, determines whether the MTC device is in the communication window; and when the communication window of the MTC device is not stored locally, the SGSN/MME further determines whether time control information of the MTC device is stored locally; when the communication window of the MTC device is not stored locally, but the time control information of the MTC device is stored locally, the SGSN/MME generates a communication window according to the time control information and a local network strategy, and then determines whether the MTC device is in the generated communication window; when neither the communication window of the MTC device nor the time control information of the MTC device is stored locally, the SGSN/MME obtains the time control information of the MTC device from a Home Subscriber Server (HSS)/Home Location Register (HLR), generates a communication window according to the time control information and the local network strategy, and then determines whether the MTC device is in the generated communication window.

The time control information generally may include: a grant time interval, a forbidden time interval, and an access duration.

In Step 104, when the MTC device is in an unattached state in a communication window of the MTC device, the SGSN/MME waits for attachment of the MTC device to a network.

In Step 105, it is determined whether the MTC device gets attached to a network before expiration of the communication window; if the MTC device is attached, Step 106 is executed; or if the MTC device is not in an attached state, Step 107 is executed.

In Step 106, the SGSN/MME sends the trigger to the MTC device.

Here, the SGSN/MME generally sends the trigger to the MTC device by Network Access Service (NAS) signaling.

When the SGSN/MME fails to send the trigger to the MTC device by NAS signalling, and the MTC device is capable of receiving a short message, the SGSN/MME may send the trigger to an SMS-SC, and trigger the MTC device by Short Message Service (SMS).

In Step 107, the SGSN/MME sends a trigger transmission report to the MTC-IWF.

Here, the trigger transmission report may carry the reason for an unsuccessful trigger of the MTC device, the IMSI of the MTC device, and the communication window of the MTC device.

In Step 108, after receiving the trigger transmission report, the MTC-IWF saves the trigger by sending the trigger to a Short Message Service Center (SMS-SC), and forwards the trigger transmission report to an MTC server initiating the trigger.

After the MTC-IWF forwards the trigger transmission report to the MTC server initiating the trigger, the MTC server initiates another trigger upon arrival of the next communication window.

After storing the trigger sent by the MTC-IWF, the SMS-SC may transmit the trigger to the MTC device by SMS.

Accordingly, an embodiment of the disclosure further provides a system for triggering an MTC device, including: an SGSN/MME, an MTC-IWF, an MTC device, an SMS-SC, and an MTC server.

The SGSN/MME is configured for: receiving a trigger from the MTC-IWF, wherein the trigger carries at least an International Mobile Subscriber Identifier (IMSI) of the MTC device to be triggered and information on whether the MTC device is capable of receiving a short message; determining whether the MTC device is in an unattached state; determining whether the MTC device is in a communication window of the MTC device; when it is determined that the MTC device is in an unattached state in a communication window of the MTC device, waiting for attachment of the MTC device to a network; and when the MTC device gets attached to the network before expiration of the communication window, sending the trigger to the MTC device; or when the MTC device fails to get attached to the network before expiration of the communication window, sending a trigger transmission report to the MTC-IWF.

The MTC-IWF is configured for: sending the trigger to the SGSN/MME, and after receiving the trigger transmission report, saving the trigger by sending the trigger to the SMS-SC, and forwarding the trigger transmission report to the MTC server initiating the trigger.

The MTC device is configured for: receiving the trigger sent by the SGSN/MME.

The SMS-SC is configured for: storing the trigger sent by the MTC-IWF.

The MTC server is configured for: receiving the trigger transmission report forwarded by the MTC-IWF.

In an embodiment, the SGSN/MME may specifically be configured for: sending the trigger to the MTC device by NAS signalling; and when the SGSN/MME fails to send the trigger to the MTC device by NAS signalling, and the MTC device is capable of receiving a short message, sending the trigger to the SMS-SC.

In an embodiment, the SGSN/MME may be further configured for: after the SGSN/MME determines that the MTC device is in the unattached state, determining whether the communication window of the MTC device is stored locally, and when the communication window of the MTC device is stored locally, determining whether the MTC device is in the communication window; and when the communication window of the MTC device is not stored locally, further determining whether time control information of the MTC device is stored locally; when the communication window of the MTC device is not stored locally, but the time control information of the MTC device is stored locally, generating a communication window according to the time control information and a local network strategy, and then determining whether the MTC device is in the generated communication window; when neither the communication window of the MTC device nor the time control information of the MTC device is stored locally, obtaining the time control information of the MTC device from a Home Subscriber Server (HSS)/Home Location Register (HLR), generating a communication window according to the time control information and the local network strategy, and then determining whether the MTC device is in the generated communication window.

In an embodiment, the SGSN/MME may be further configured for: when it is determined that the MTC device is in an unattached state and is outside a communication window of the MTC device, sending a trigger transmission report to the MTC-IWF.

The MTC-IWF may be further configured for: after receiving the trigger transmission report, saving the trigger by sending the trigger to the SMS-SC, and forwarding the trigger transmission report to the MTC server initiating the trigger.

The system may further include an HSS/HLR.

The MTC server may be further configured for: sending the MTC-IWF a trigger transmission request carrying an external identifier of the MTC device to be triggered, a trigger reference code, the trigger, and information on the MTC server.

The MTC-IWF may be further configured for: after determining that the MTC server is valid according to the trigger transmission request, requesting the HSS/HLR to verify whether the MTC server is authorized to trigger the MTC device; and when determining that the MTC server is authorized to trigger the MTC device according to a response returned by the HSS/HLR, forwarding the trigger to the SGSN/MME.

The HSS/HLR may be configured for: storing subscription information (such as the IMSI, the time control information, etc.) of the MTC device, and optionally provide some subscription information of the MTC device to another security entity. In the disclosure, the HSS/HLR may be configured for: returning to the MTC-IWF the response carrying information on whether the MTC server is authorized to trigger the MTC device, the IMSI of the MTC device, an address of the SGSN/MME, and the information on whether the MTC device is capable of receiving a short message.

In an embodiment, the MTC server may be further configured for: after receiving the trigger transmission report forwarded by the MTC-IWF, initiating another trigger upon arrival of the next communication window.

The disclosure is further elaborated below with reference to specific embodiments.

Embodiment 1

Figure 2:
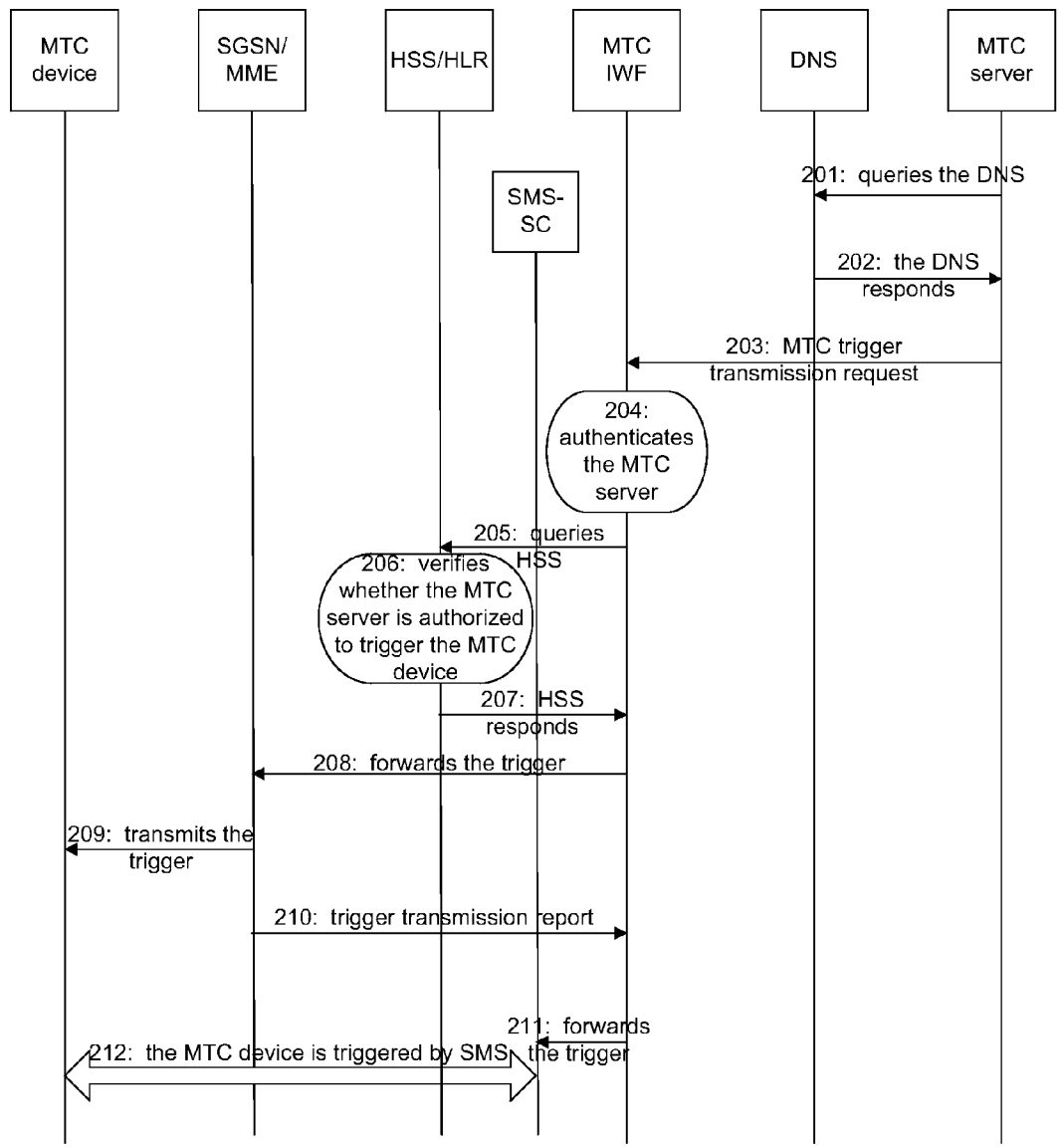
FIG. 2 is a flow chart of triggering an MTC device in an attached state according to Embodiment 1 of the disclosure.

The embodiment provides a flow of triggering an MTC device in an unattached state. As shown in FIG. 2, the flow includes steps as follows.

In Step 201, an MTC server is to trigger an MTC device; if the MTC server does not know how to connect to an MTC-IWF, the MTC server inquires a Domain Name System (DNS) for an Internet Protocol (IP) address and a port of the MTC-IWF using the external identifier of the MTC device.

In Step 202, the DNS informs the MTC server of the IP address and the port of the MTC-IWF.

In Step 203, the MTC server sends the MTC-IWF an MTC device trigger transmission request including information such as the external identifier of the MTC device, an Identifier (ID) of the MTC server, the IP address and the port of the MTC server.

In Step 204, the MTC-IWF authenticates the MTC server to see if the MTC server is authorized and allowed to send a trigger request.

In Step 205, if the MTC server is valid, the MTC-IWF sends the HSS/HLR a query to let the HSS/HLR authenticate the MTC server to see if the MTC server is authorized to trigger the MTC device; the query includes the external identifier of the MTC device and the ID of the MTC server.

In Step 206, the HSS/HLR finds the IMSI of the MTC device through the external identifier of the MTC device, and sees if the MTC device is authorized to trigger the MTC device.

In Step 207, the HSS/HLR returns a result of the authentication to the MTC-IWF to inform the MTC-IWF of whether the MTC server is authorized to trigger the MTC device, and informs the MTC-IWF of the IMSI of the MTC device; the HSS/HLR has to inform the MTC-IWF of the address of the SGSN/MME, which is registered in the HSS by the MTC device via a last Tracking Area Update (TAU)/Route Area Update (RAU) process; the HSS/HLR also has to inform the MTC-IWF of the information on whether the MTC device is capable of receiving a short message.

In Step 208, when the MTC server is authorized to trigger the MTC device, the MTC-IWF forwards the trigger, including the IMSI of the MTC device, to the SGSN/MME as informed by the HSS/HLR in Step 207; and the MTC-IWF has to inform the SGSN/MME of the information on whether the MTC device is capable of receiving a short message.

In Step 209, if the SGSN/MME detects that the MTC device is in an attached state, then the MTC device must be in the communication window of the MTC device; the SGSN/MME will transmit the trigger to the MTC device by NAS signaling.

In Step 210, the SGSN/MME sends a trigger transmission report to the MTC-IWF to inform the MTC-IWF of a successful or unsuccessful transmission of the trigger.

In Step 211, when the MTC-IWF receives an indication of a failure to transmit the trigger by NAS signaling and the MTC device is capable of receiving a short message, the MTC-IWF saves the trigger by sending the trigger to the SMS-SC so as to trigger the MTC device by SMS.

In Step 212, a network triggers the MTC device by SMS.

Embodiment 2

Figure 3:
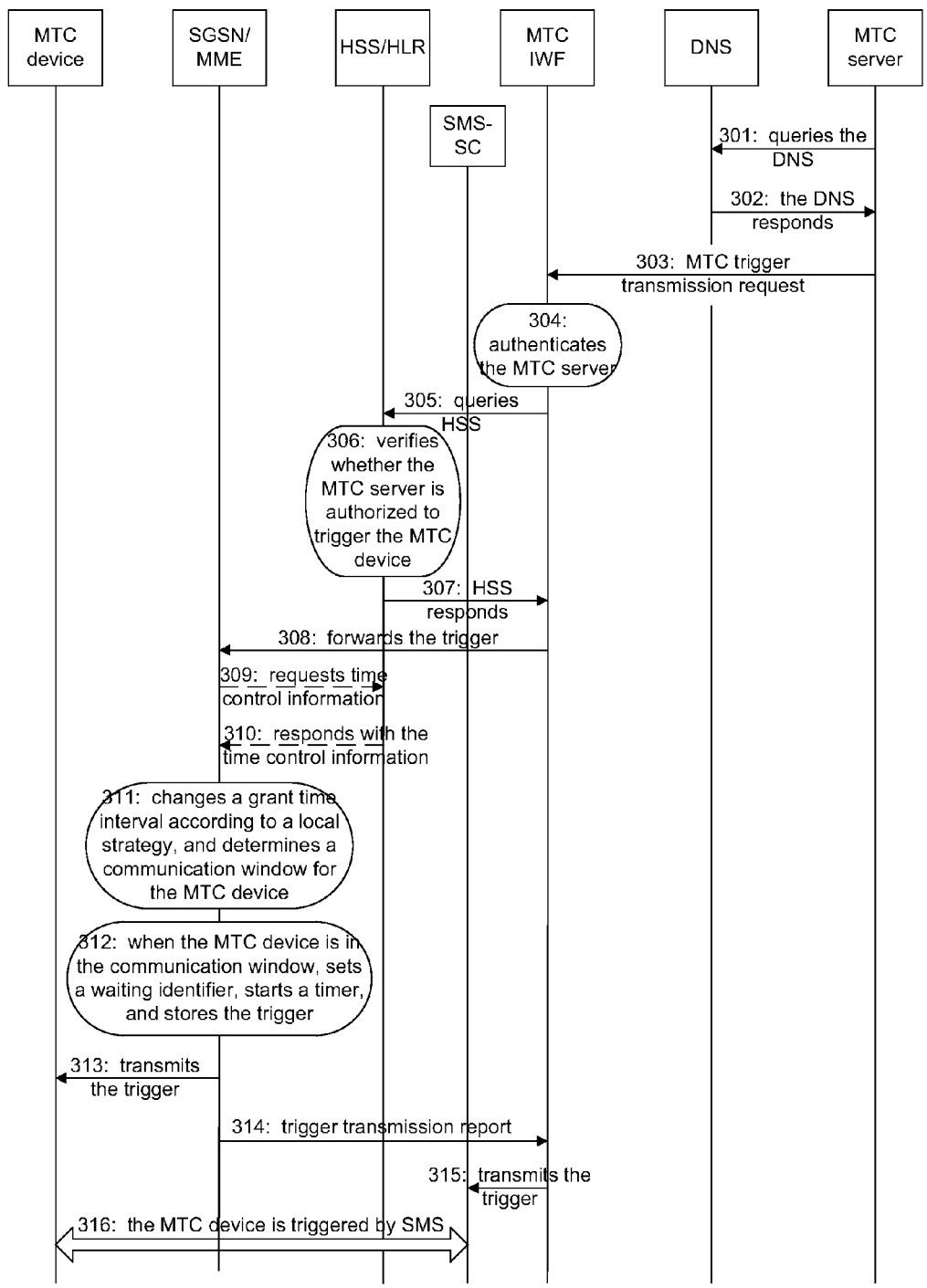
FIG. 3 is a flow chart of triggering an MTC device in an unattached state in the communication window of the MTC device according to Embodiment 2 of the disclosure.

The embodiment describes a flow of triggering an MTC device in an unattached state in the communication window of the MTC device, in which case, the MTC device then gets attached to a network in the communication window; as shown in FIG. 3, the flow specifically includes steps as follows.

In Step 301, an MTC server is to trigger an MTC device; if the MTC server does not know how to connect to an MTC-IWF, the MTC server inquires a Domain Name System (DNS) for an Internet Protocol (IP) address and a port of the MTC-IWF using the external identifier of the MTC device.

In Step 302, the DNS informs the MTC server of the IP address and the port of the MTC-IWF.

In Step 303, the MTC server sends the MTC-IWF an MTC device trigger transmission request including information such as the external identifier of the MTC device, an ID of the MTC server, the IP address and the port of the MTC server.

In Step 304, the MTC-IWF authenticates the MTC server to see if the MTC server is authorized and allowed to send a trigger request.

In Step 305, the MTC-IWF sends the HSS/HLR a query to let the HSS/HLR authenticate the MTC server to see if the MTC server is authorized to trigger the MTC device; the query includes the external identifier of the MTC device and the ID of the MTC server.

In Step 306, the HSS/HLR finds the IMSI of the MTC device through the external identifier of the MTC device, and sees if the MTC device is authorized to trigger the MTC device.

In Step 307, the HSS/HLR returns a result of the authentication to the MTC-IWF to inform the MTC-IWF of whether the MTC server is authorized to trigger the MTC device, and informs the MTC-IWF of the IMSI of the MTC device; the HSS/HLR has to inform the MTC-IWF of the address of the SGSN/MME, which is registered in the HSS by the MTC device via a last TAU/RAU process; the HSS/HLR also has to inform the MTC-IWF of the information on whether the MTC device is capable of receiving a short message.

In Step 308, when the MTC server is authorized to trigger the MTC device, the MTC-IWF forwards the trigger, including the IMSI of the MTC device, to the SGSN/MME as informed by the HSS/HLR in Step 107; and the MTC-IWF has to inform the SGSN/MME of the information on whether the MTC device is capable of receiving a short message.

In Step 309, if the SGSN/MME determines that the MTC device is in an unattached state, and if no effective time control information of the MTC device exists locally at the SGSN/MME, the SGSN/MME sends the HSS/HLR a query including the IMSI of the MTC device.

In Step 310, the HSS/HLR sends the SGSN/MME the time control information of the MTC device, including a grant time interval, a forbidden time interval and an access duration.

In Step 311, when there is no communication window of the MTC device in the SGSN/MME, the SGSN/MME randomizes a communication window as the effective communication window of the MTC device according to a local network strategy and the time control information sent by the HSS/HLR; when there is a local communication window of the MTC device available in the SGSN/MME, the local communication window is taken as the effective communication window of the MTC device.

In Step 312, when the MTC device is in the effective communication window of the MTC device, the SGSN/MME sets a waiting identifier of the MTC device, stores the trigger, and starts a timer which expires as the communication window expires.

In Step 313, when the MTC device gets attached to a network before the timer expires, the SGSN/MME sends the trigger to the MTC device by NAS signaling.

In Step 314, the SGSN/MME sends a trigger transmission report to the MTC-IWF to inform the MTC-IWF of whether the trigger is transmitted successfully or not.

In Step 315, when the MTC-IWF receives an indication of a failure to transmit the trigger by NAS signaling and the MTC device is capable of receiving a short message, the MTC-IWF saves the trigger by sending the trigger to the SMS-SC so as to trigger the MTC device by SMS.

In Step 316, the network triggers the MTC device by SMS.
Embodiment 3

Figure 4:
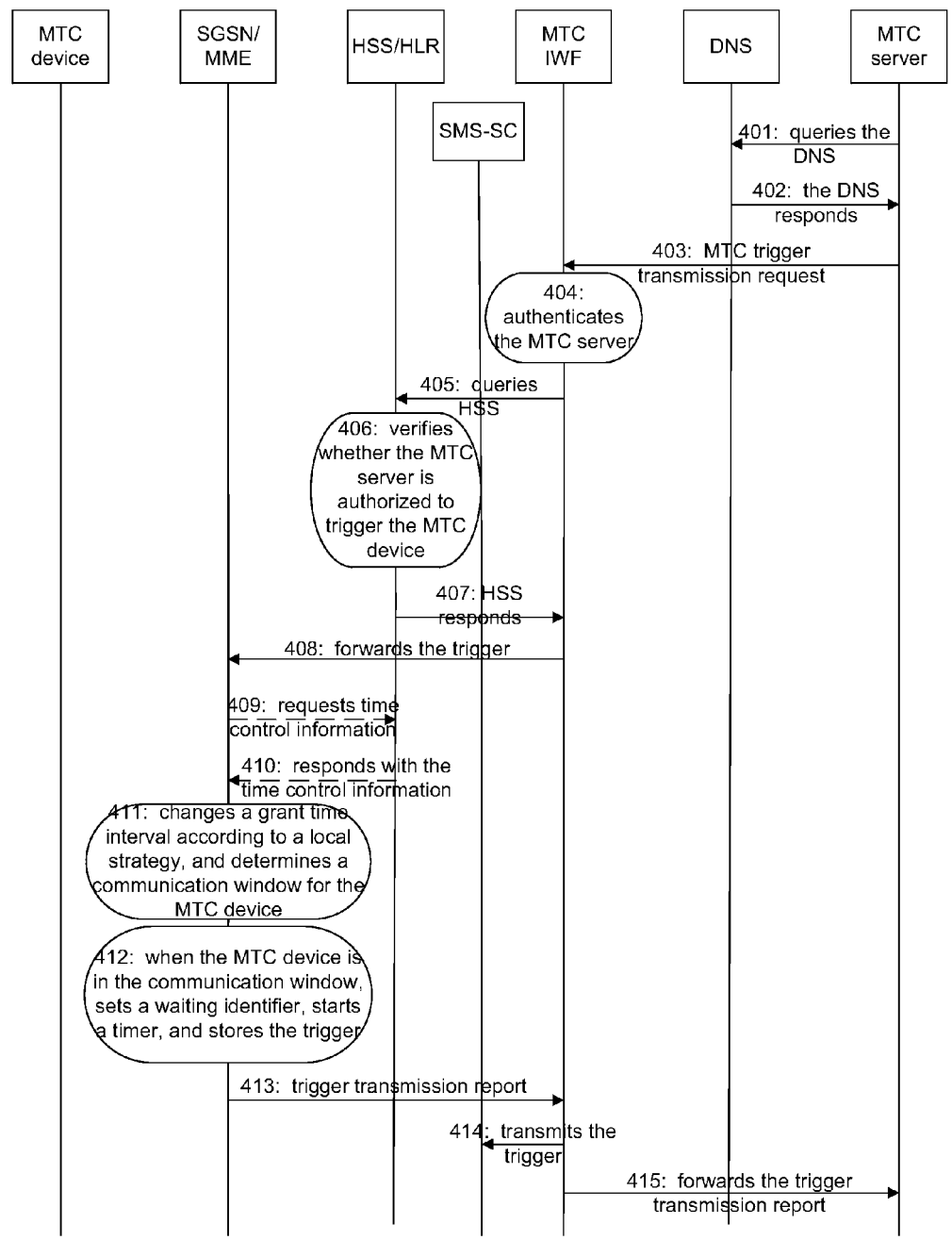
FIG. 4 is a flow chart of triggering an MTC device in an unattached state in the communication window of the MTC device according to Embodiment 3 of the disclosure.

The embodiment described a flow of triggering an MTC device in an unattached state in the communication window of the MTC device, in which case, the MTC device has not been attached to a network in the communication window; as shown in FIG. 4, the flow specifically includes steps as follows.

In Step 401, an MTC server is to trigger an MTC device; if the MTC server does not know how to connect to an MTC-IWF, the MTC server inquires a Domain Name System (DNS) for an Internet Protocol (IP) address and a port of the MTC-IWF using the external identifier of the MTC device.

In Step 402, the DNS informs the MTC server of the IP address and the port of the MTC-IWF.

In Step 403, the MTC server sends the MTC-IWF an MTC device trigger transmission request including information such as the external identifier of the MTC device, an ID of the MTC server, the IP address and the port of the MTC server.

In Step 404, the MTC-IWF authenticates the MTC server to see if the MTC server is authorized and allowed to send a trigger request.

In Step 405, the MTC-IWF sends the HSS/HLR a query to let the HSS/HLR authenticate the MTC server to see if the MTC server is authorized to trigger the MTC device; the query includes the external identifier of the MTC device and the ID of the MTC server.

In Step 406, the HSS/HLR finds the IMSI of the MTC device through the external identifier of the MTC device, and sees if the MTC device is authorized to trigger the MTC device.

In Step 407, the HSS/HLR returns a result of the authentication to the MTC-IWF to inform the MTC-IWF of whether the MTC server is authorized to trigger the MTC device, and informs the MTC-IWF of the IMSI of the MTC device; the HSS/HLR has to inform the MTC-IWF of the address of the SGSN/MME, which is registered in the HSS by the MTC device via a last TAU/RAU process; the HSS/HLR also has to inform the MTC-IWF of the information on whether the MTC device is capable of receiving a short message.

In Step 408, when the MTC server is authorized to trigger the MTC device, the MTC-IWF forwards the trigger, including the IMSI of the MTC device, to the SGSN/MME as informed by the HSS/HLR in Step 107; and the MTC-IWF has to inform the SGSN/MME of the information on whether the MTC device is capable of receiving a short message.

In Step 409, if the SGSN/MME determines that the MTC device is in an unattached state, and if no effective time control information of the MTC device exists locally at the SGSN/MME, the SGSN/MME sends the HSS/HLR a query including the IMSI of the MTC device.

In Step 410, the HSS/HLR sends the SGSN/MME the time control information of the MTC device, including a grant time interval, a forbidden time interval and an access duration.

In Step 411, when there is no communication window of the MTC device in the SGSN/MME, the SGSN/MME randomizes a communication window as the effective communication window of the MTC device according to a local network strategy and the time control information sent by the HSS/HLR; when there is a local communication window of the MTC device available in the SGSN/MME, the local communication window is taken as the effective communication window of the MTC device.

In Step 412, when the MTC device is in the effective communication window of the MTC device, the SGSN/MME sets a waiting identifier of the MTC device, stores the trigger, and starts a timer which expires as the communication window expires.

In Step 413, when the MTC device fails to get attached to a network before the timer expires, the SGSN/MME sends a trigger transmission report to the MTC-IWF, informing the MTC-IWF of the failure to trigger the MTC device and indicating that the reason for the failure is that the MTC device fails to get attached to the network before expiration of the communication window. The IMSI and the communication window of the MTC device are attached in the report of the failed trigger.

In Step 414, when the MTC device is capable of receiving a short message, the MTC-IWF saves the trigger by sending the trigger to the SMS-SC, such that the MTC device may be triggered by SMS once the MTC device gets attached.

In Step 415, the MTC-IWF forwards the trigger transmission report to the MTC server, indicating that the reason for the failure is that the MTC device fails to get attached to the network before expiration of the communication window. The external identifier and the communication window of the MTC device are attached in the report of the failed trigger, such that the MTC server is instructed to initiate another trigger upon arrival of the next communication window.

Embodiment 4

Figure 5:
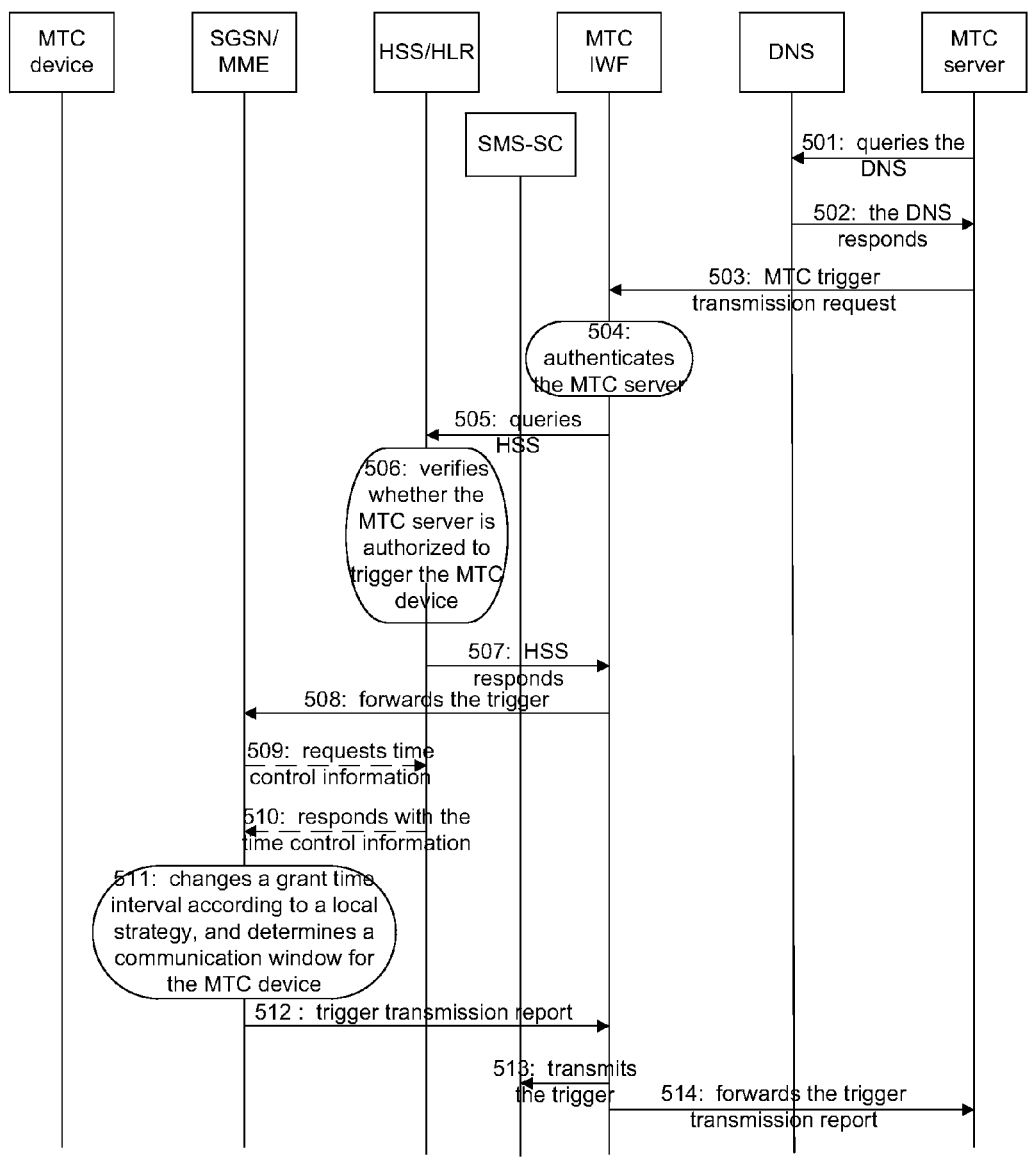
FIG. 5 is a flow chart of triggering an MTC device in an unattached state outside the communication window of the MTC device according to Embodiment 4 of the disclosure.

The embodiment describes a flow of triggering an MTC device in an unattached state outside the communication window of the MTC device; as shown in FIG. 5, the flow specifically includes steps as follows.

In Step 501, an MTC server is to trigger an MTC device; if the MTC server does not know how to connect to an MTC-IWF, the MTC server inquires a Domain Name System (DNS) for an Internet Protocol (IP) address and a port of the MTC-IWF using the external identifier of the MTC device.

In Step 502, the DNS informs the MTC server of the IP address and the port of the MTC-IWF.

In Step 503, the MTC server sends the MTC-IWF an MTC device trigger transmission request including information such as the external identifier of the MTC device, an ID of the MTC server, the IP address and the port of the MTC server.

In Step 504, the MTC-IWF authenticates the MTC server to see if the MTC server is authorized and allowed to send a trigger request.

In Step 505, the MTC-IWF sends the HSS/HLR a query to let the HSS/HLR authenticate the MTC server to see if the MTC server is authorized to trigger the MTC device; the query includes the external identifier of the MTC device and the ID of the MTC server.

In Step 506, the HSS/HLR finds the IMSI of the MTC device through the external identifier of the MTC device, and sees if the MTC device is authorized to trigger the MTC device.

In Step 507, the HSS/HLR returns a result of the authentication to the MTC-IWF to inform the MTC-IWF of whether the MTC server is authorized to trigger the MTC device, and informs the MTC-IWF of the IMSI of the MTC device; the HSS/HLR has to inform the MTC-IWF of the address of the SGSN/MME, which is registered in the HSS by the MTC device via a last TAU/RAU process; the HSS/HLR also has to inform the MTC-IWF of the information on whether the MTC device is capable of receiving a short message.

In Step 508, when the MTC server is authorized to trigger the MTC device, the MTC-IWF forwards the trigger, including the IMSI of the MTC device, to the SGSN/MME as informed by the HSS/HLR in Step 107; and the MTC-IWF has to inform the SGSN/MME of the information on whether the MTC device is capable of receiving a short message.

In Step 509, if the SGSN/MME determines that the MTC device is in an unattached state, and if no effective time control information of the MTC device exists locally at the SGSN/MME, the SGSN/MME sends the HSS/HLR a query including the IMSI of the MTC device.

In Step 510, the HSS/HLR sends the SGSN/MME the time control information of the MTC device, including a grant time interval, a forbidden time interval and an access duration.

In Step 511, when there is no communication window of the MTC device in the SGSN/MME, the SGSN/MME randomizes a communication window as the effective communication window of the MTC device according to a local network strategy and the time control information sent by the HSS/HLR; when there is a local communication window of the MTC device available in the SGSN/MME, the local communication window is taken as the effective communication window of the MTC device.

In Step 512, when the MTC device is not in the effective communication window of the MTC device, the SGSN/MME sends a trigger transmission report to the MTC-IWF, informing the MTC-IWF of the failure to trigger the MTC device and indicating that the reason for the failure is that the MTC device is not attached and is not in the communication window. The IMSI and the communication window of the MTC device are attached in the report of the failed trigger.

In Step 513, when the MTC device is capable of receiving a short message, the MTC-IWF saves the trigger by sending the trigger to the SMS-SC, such that the MTC device may be triggered by SMS once the MTC device gets attached.

In Step 514, the MTC-IWF forwards the trigger transmission report to the MTC server, indicating that the reason for the failure is that the MTC device not attached and is not in the communication window. The external identifier and the communication window of the MTC device are attached in the report of the failed trigger, such that the MTC server is instructed to initiate another trigger upon arrival of the next communication window.

What described are merely embodiments of the disclosure, and are not intended to limit the protection scope of the disclosure.

The invention claimed is:

1. A method for triggering a Machine Type Communication (MTC) device, comprising steps of:

receiving, by a Serving General Packet Radio Service Support Node (SGSN)/Mobility Management Entity (MME), a trigger from an MTC InterWorking Function (MTC-IWF), wherein the trigger carries at least an International Mobile Subscriber Identifier (IMSI) of an MTC device to be triggered, and information on whether the MTC device is capable of receiving a short message;

determining, by the SGSN/MME, whether the MTC device is in an unattached state; determining whether the MTC device is in a communication window of the MTC device; and when it is determined that the MTC device is in an unattached state, and the MTC device is in a communication window of the MTC device, waiting for attachment of the MTC device to a network; and when the MTC device gets attached to the network before expiration of the communication window, sending, by the SGSN/MME, the trigger to the MTC device; or when the MTC device fails to get attached to the network before expiration of the communication window, sending, by the SGSN/MME, a trigger transmission report to the MTC-IWF, such that after receiving the trigger transmission report, the MTC-IWF saves the trigger by sending the trigger to a Short Message Service Center (SMS-SC), and forwards the trigger transmission report to an MTC server initiating the trigger, wherein the method further comprises steps of: after the SGSN/MME determines that the MTC device is in the unattached state, determining, by the SGSN/MME, whether the communication window of the MTC device is stored locally, and when the communication window of the MTC device is stored locally, determining whether the MTC device is in the communication window; and when the communication window of the MTC device is not stored locally, further determining, by the SGSN/MME, whether time control information of the MTC device is stored locally; when the communication window of the MTC device is not stored locally, but the time control information of the MTC device is stored locally, generating a communication window according to the time control information and a local network strategy, and then determining whether the MTC device is in the generated communication window; when neither the communication window of the MTC device nor the time control information of the MTC device is stored locally, obtaining the time control information of the MTC device from a Home Subscriber Server (HSS)/Home Location Register (HLR), generating a communication window according to the time control information and the local network strategy, and then determining whether the MTC device is in the generated communication window.

2. The method according to claim 1, wherein
the step of sending, by the SGSN/MME, the trigger to the MTC device is: sending, by the SGSN/MME, the trigger to the MTC device by Network Access Service (NAS) signalling; and
the method further comprises a step of: when the SGSN/MME fails to send the trigger to the MTC device by NAS signalling, and the MTC device is capable of receiving a short message, sending, by the SGSN/MME, the trigger to the SMS-SC, and triggering the MTC device by Short Message Service (SMS).

3. The method according to claim 2, wherein the trigger transmission report carries a reason for an unsuccessful trigger of the MTC device, and the IMSI and the communication window of the MTC device, and
after the MTC-IWF forwards the trigger transmission report to the MTC server initiating the trigger, the MTC server initiates another trigger upon arrival of the next communication window.

4. The method according to claim 1, further comprising a step of:
when it is determined that the MTC device is in an unattached state and is outside a communication window of the MTC device, sending, by the SGSN/MME, a trigger transmission report to the MTC-IWF, such that after receiving the trigger transmission report, the MTC-IWF saves the trigger by sending the trigger to the SMS-SC, and forwards the trigger transmission report to the MTC server initiating the trigger.

5. The method according to claim 4, wherein the trigger transmission report carries a reason for an unsuccessful trigger of the MTC device, and the IMSI and the communication window of the MTC device, and
after the MTC-IWF forwards the trigger transmission report to the MTC server initiating the trigger, the MTC server initiates another trigger upon arrival of the next communication window.

6. The method according to claim 1, wherein before the SGSN/MME receives the trigger from the MTC-IWF,
the MTC server sends the MTC-IWF a trigger transmission request carrying an external identifier of the MTC device to be triggered, a trigger reference code, the trigger, and information on the MTC server;
after determining that the MTC server is valid according to the trigger transmission request, the MTC-IWF requests an HSS/HLR to verify whether the MTC server is authorized to trigger the MTC device;
the HSS/HLR returns to the MTC-IWF a response carrying information on whether the MTC server is authorized to trigger the MTC device, the IMSI of the MTC device, an address of the SGSN/MME, and the information on whether the MTC device is capable of receiving a short message; and
when determining that the MTC server is authorized to trigger the MTC device according to the response, the MTC-IWF forwards the trigger to the SGSN/MME.

7. The method according to claim 6, wherein the trigger transmission report carries a reason for an unsuccessful trigger of the MTC device, and the IMSI and the communication window of the MTC device, and
after the MTC-IWF forwards the trigger transmission report to the MTC server initiating the trigger, the MTC server initiates another trigger upon arrival of the next communication window.

8. The method according to claim 1, wherein the trigger transmission report carries a reason for an unsuccessful trigger of the MTC device, and the IMSI and the communication window of the MTC device, and
after the MTC-IWF forwards the trigger transmission report to the MTC server initiating the trigger, the MTC server initiates another trigger upon arrival of the next communication window.

9. A method for triggering a Machine Type Communication (MTC) device, comprising steps of:
receiving, by a Serving General Packet Radio Service Support Node (SGSN)/Mobility Management Entity (MME), a trigger from an MTC InterWorking Function (MTC-IWF), wherein the trigger carries at least an International Mobile Subscriber Identifier (IMSI) of an MTC device to be triggered, and information on whether the MTC device is capable of receiving a short message;
determining, by the SGSN/MME, whether the MTC device is in an unattached state; determining whether the MTC device is in a communication window of the MTC device; and when it is determined that the MTC device is in an unattached state, and the MTC device is in a communication window of the MTC device, waiting for attachment of the MTC device to a network; and
when the MTC device gets attached to the network before expiration of the communication window, sending, by the SGSN/MME, the trigger to the MTC device; or when the MTC device fails to get attached to the network before expiration of the communication window, sending, by the SGSN/MME, a trigger transmission report to the MTC-IWF, such that after receiving the trigger transmission report, the MTC-IWF saves the trigger by sending the trigger to a Short Message Service Center (SMS-SC), and forwards the trigger transmission report to an MTC server initiating the trigger,
wherein the method further comprises a step of:
when it is determined that the MTC device is in an unattached state and is outside a communication window of the MTC device, sending, by the SGSN/MME, a trigger transmission report to the MTC-IWF, such that after receiving the trigger transmission report, the MTC-IWF saves the trigger by sending the trigger to the SMS-SC, and forwards the trigger transmission report to the MTC server initiating the trigger.

10. The method according to claim 9, wherein the trigger transmission report carries a reason for an unsuccessful trigger of the MTC device, and the IMSI and the communication window of the MTC device, and
after the MTC-IWF forwards the trigger transmission report to the MTC server initiating the trigger, the MTC server initiates another trigger upon arrival of the next communication window.

11. A system for triggering a Machine Type Communication (MTC) device, comprising: a Serving General Packet Radio Service Support Node (SGSN)/Mobility Management Entity (MME), an MTC InterWorking Function (MTC-IWF), an MTC device, a Short Message Service Center (SMS-SC), and an MTC server, wherein
the SGSN/MME is configured for: receiving a trigger from the MTC-IWF, wherein the trigger carries at least an International Mobile Subscriber Identifier (IMSI) of the MTC device to be triggered and information on whether the MTC device is capable of receiving a short message;

determining whether the MTC device is in an unattached state; determining whether the MTC device is in a communication window of the MTC device; when it is determined that the MTC device is in an unattached state, and the MTC device is in a communication window of the MTC device, waiting for attachment of the MTC device to a network; and when the MTC device gets attached to the network before expiration of the communication window, sending the trigger to the MTC device; or when the MTC device fails to get attached to the network before expiration of the communication window, sending a trigger transmission report to the MTC-IWF;

the MTC-IWF is configured for: sending the trigger to the SGSN/MME, and after receiving the trigger transmission report, saving the trigger by sending the trigger to the SMS-SC, and forwarding the trigger transmission report to the MTC server initiating the trigger;

the MTC device is configured for: receiving the trigger sent by the SGSN/MME;

the SMS-SC is configured for: storing the trigger sent by the MTC-IWF; and the MTC server is configured for: receiving the trigger transmission report forwarded by the MTC-IWF, wherein the SGSN/MME is further configured for: after the SGSN/MME determines that the MTC device is in the unattached state, determining whether the communication window of the MTC device is stored locally, and when the communication window of the MTC device is stored locally, determining whether the MTC device is in the communication window; and when the communication window of the MTC device is not stored locally, further determining whether time control information of the MTC device is stored locally; when the communication window of the MTC device is not stored locally, but the time control information of the MTC device is stored locally, generating a communication window according to the time control information and a local network strategy, and then determining whether the MTC device is in the generated communication window; when neither the communication window of the MTC device nor the time control information of the MTC device is stored locally, obtaining the time control information of the MTC device from a Home Subscriber Server (HSS)/Home Location Register (HLR), generating a communication window according to the time control information and the local network strategy, and then determining whether the MTC device is in the generated communication window.

12. The system according to claim 11, wherein
the SGSN/MME is configured for: sending the trigger to the MTC device by Network Access Service (NAS) signalling; and when the SGSN/MME fails to send the trigger to the MTC device by NAS signalling, and the MTC device is capable of receiving a short message, sending the trigger to the SMS-SC.

13. The system according to claim 12, wherein
the MTC server is further configured for: after receiving the trigger transmission report forwarded by the MTC-IWF, initiating another trigger upon arrival of the next communication window.

14. The system according to claim 11, wherein
the SGSN/MME is further configured for: when it is determined that the MTC device is in an unattached state and is outside a communication window of the MTC device, sending a trigger transmission report to the MTC-IWF; and the MTC-IWF is further configured for: after receiving the trigger transmission report, saving the trigger by sending the trigger to the SMS-SC, and forwarding the trigger transmission report to the MTC server initiating the trigger.

15. The system according to claim 14, wherein
the MTC server is further configured for: after receiving the trigger transmission report forwarded by the MTC-IWF, initiating another trigger upon arrival of the next communication window.

16. The system according to claim 11, further comprising an HSS/HLR, wherein
the MTC server is further configured for: sending the MTC-IWF a trigger transmission request carrying an external identifier of the MTC device to be triggered, a trigger reference code, the trigger, and information on the MTC server;

the MTC-IWF is further configured for: after determining that the MTC server is valid according to the trigger transmission request, requesting the HSS/HLR to verify whether the MTC server is authorized to trigger the MTC device; and when determining that the MTC server is authorized to trigger the MTC device according to a response returned by the HSS/HLR, forwarding the trigger to the SGSN/MME; and the HSS/HLR is configured for: returning to the MTC-IWF the response carrying information on whether the MTC server is authorized to trigger the MTC device, the IMSI of the MTC device, an address of the SGSN/MME, and the information on whether the MTC device is capable of receiving a short message.

17. The system according to claim 16, wherein
the MTC server is further configured for: after receiving the trigger transmission report forwarded by the MTC-IWF, initiating another trigger upon arrival of the next communication window.

18. The system according to claim 11, wherein
the MTC server is further configured for: after receiving the trigger transmission report forwarded by the MTC-IWF, initiating another trigger upon arrival of the next communication window.

\* \* \* \* \*